United States Patent
Knight

[11] 3,910,745
[45] Oct. 7, 1975

[54] TUBE SHAPING APPARATUS
[75] Inventor: Alan Campbell Knight, Vienna, W. Va.
[73] Assignee: E. I. Du Pont de Nemours and Company, Wilmington, Del.
[22] Filed: Mar. 14, 1974
[21] Appl. No.: 451,118

[52] U.S. Cl................ 425/387 R; 264/94; 425/392
[51] Int. Cl....................... B29c 17/04; B29c 17/07
[58] Field of Search.......... 425/387, 389, 383, 392; 264/94, 95

[56] References Cited
UNITED STATES PATENTS

| | | | |
|---|---|---|---|
| 1,530,901 | 3/1925 | McMillin et al. | 425/392 |
| 2,678,677 | 5/1954 | Hervey et al. | 425/389 X |
| 2,698,458 | 1/1955 | Keach | 425/392 |
| 2,958,364 | 11/1960 | Thompson | 425/503 X |
| 2,999,272 | 9/1961 | Warnken | 425/392 X |
| 3,196,194 | 7/1965 | Ely, Jr. et al. | 264/95 |

*Primary Examiner*—Robert L. Spicer, Jr.

[57] ABSTRACT

A device for minimizing the seam formed longitudinally along the exterior of heat-shrinkable plastic tubing when the tubing is prepared by pressurizing and heating the interior of an expandable plastic tubing until it is expanded against a cylindrical-like sheet surrounding the plastic tubing, which cylindrical-like sheet has been formed by looping the sheet and clamping the looped ends with longitudinal clamps, which comprises a. a pair of opposing clamps having opposing surfaces for clamping the looped flexible sheet, said clamps extending longitudinally along the length of the looped sheet and positioned to clamp the looped ends of the sheet, said sheet comes together to form a cylinder, said clamps each having a shaped surface along the edge that abuts the looped sheet where the looped ends enter between the clamps, b. a spacer positioned between said clamps and between the opposing looped ends of the sheet, extending longitudinally the length of the clamps, said spacer having means for receiving and fastening a plate which extends into the closure formed by the looped sheet, c. a longitudinally flexible plate within the closure formed by the looped sheet extending longitudinally the length of the clamps, constructed and arranged to be fastened to said spacer at said means for receiving and fastening a plate, so that the plane of the plate is perpendicular to the opposing surfaces of the clamps, said plate having shaped portions along each longitudinal edge thereof constructed and positioned to conform with and match the shaped surface of each said clamp when in abutting position therewith, and d. means for adjusting the position of said plate relative to said spacer.

3 Claims, 6 Drawing Figures

TUBE SHAPING APPARATUS

FIELD OF THE INVENTION

This invention relates to the manufacture of heat-shrinkable, plastic tubing. More particularly, this invention is directed to a novel device for eliminating the seam formed when heat-shrinkable plastic tubing is prepared by expanding the tubing within the confines of an adjustable, flexible cylindrical restraint.

BACKGROUND OF THE INVENTION

Heat-shrinkable, plastic tubing has many uses. Polyolefin heat-shrinkable tubing is used in packaging food. Tetrafluoroethylene polymer heat-shrinkable tubing, because of its chemical resistance and electrical properties, is placed around elastomeric rolls used in printing presses and copying machines and is also used for putting a snugly fitting coating on electrical connections. Generally in these applications, the tubing is placed around the article to be covered and then heat shrunk to form a tight fit around the article.

In the art, heat-shrinkable plastic tubing can be made by radially expanding lengths of extruded tubing to a larger diameter within a rigid pipe such as a metal or glass pipe, heating the pipe externally and pressurizing the interior of the plastic tubing to cause it to radially expand against the interior walls of the pipe, cooling and then releasing the pressure. The plastic tubing so prepared retains sufficient orientation to produce a substantial, e.g., 30%, radial shrinkage when it is placed around an article and heated, which causes it to shrink tightly around the article.

Recently, however, as disclosed in U.S. application Ser. No. 451,119, filed on Mar. 14, 1974 a new procedure for making heat-shrinkable plastic tubing has been developed in which the rigid pipe is replaced by a flexible sheet looped into cylindrical form to provide an easily adjustable restraint, and in which steam is used to heat and pressurize the interior of the plastic tubing to be radially expanded against the confines of the cylindrical restraint.

Because the cylindrical restraint is a flexible sheet that has been looped back upon itself and clamped longitudinally along the abutting portions of the sheet, the pressurized expansion of the plastic tubing results in a longitudinal seam-like ridge in the expanded plastic tubing which occurs adjacent the abutting portions of the looped flexible sheet.

This invention provides a device for preventing formation of this ridge.

SUMMARY OF THE INVENTION

A device for minimizing the seam formed longitudinally along the exterior of heat-shrinkable plastic tubing when the tubing is prepared by pressurizing and heating the interior of an expandable plastic tubing until it is expanded against a cylindrical-like sheet surrounding the plastic tubing, which cylindrical-like sheet has been formed by looping the sheet and clamping the looped ends with longitudinal clamps, which comprises a. a pair of opposing clamps having opposing surfaces for clamping the looped flexible sheet, said clamps extending longitudinally along the length of the looped sheet and positioned to clamp the looped ends of the sheet, said clamps each having a shaped surface along the edge that abuts the looped sheet where the looped ends enter between the clamps, b. a spacer positioned between said clamps, and between the opposing looped ends of the sheet extending longitudinally the length of the clamps, said spacer having means for receiving and fastening a plate which extends into the closure formed by the looped sheet c. a longitudinally flexible plate within the closure formed by the looped sheet extending longitudinally the length of the clamps, constructed and arranged to be fastened to said spacer at said means for receiving and fastening a plate so that the plane of the plate is perpendicular to the opposing surfaces of the clamps, said plate having shaped portions along each longitudinal edge thereof constructed and positioned to conform with and match the shaped surface of each said clamp when in abutting position therewith, and d. means for adjusting the position of said plate relative to said spacer.

DESCRIPTION OF THE INVENTION

In the preparation of heat-shrinkable plastic tubing, expandable plastic tubing is positioned longitudinally within a cylindrical restraint of larger diameter than that of the expandable plastic tubing. Steam is usually then admitted under pressure into the interior of the expandable plastic tubing, thus inflating it and stretching it until it reaches the confines of the cylindrical restraint. The steam is exited as cooling air is forced into the plastic tubing. Upon withdrawal of the plastic tubing from the cylinder, a plastic tube is obtained, which because of its plastic memory, will shrink to substantially its original diameter upon the application of heat. Heat-shrinkable tubing so prepared is useful as described further above.

Figure 5:
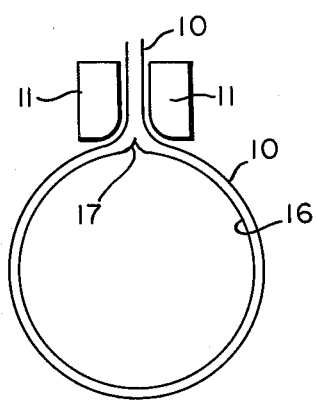
FIG. 5 is a view of the looped flexible sheet 10 clamped with clamps 11 in which the device of this invention is not present. The figure shows the expanded plastic tubing 16 pressurized against the walls of the sheet 10 and shows the ridge 17, which is created when the device of this invention is not present.

When the cylindrical restraint is made of a looped flexible sheet (for ease in adjusting the diameter of the cylinder in order to obtain varying size heat-shrinkable tubing), the pressure against the interior of the tubing expands it radially against the walls of the surrounding cylindrical restraint. As shown in FIG. 5, at the point where the looped flexible sheet comes together to form a cylinder, point 17, a ridge is formed in the radially expanded plastic tube. This ridge remains even after the plastic tube is collapsed and removed from the cylindrical restraint.

Figure 1:
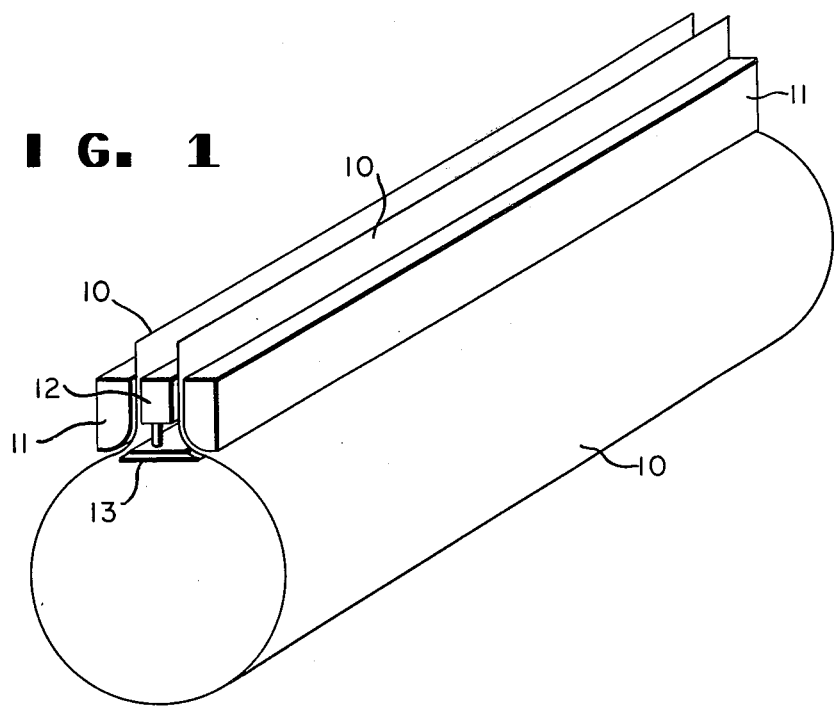
FIG. 1 is a perspective view of the looped restraining flexible sheet 10 showing the opposing longitudinal clamps 11, spacer 12, and plate 13.
Figure 2:
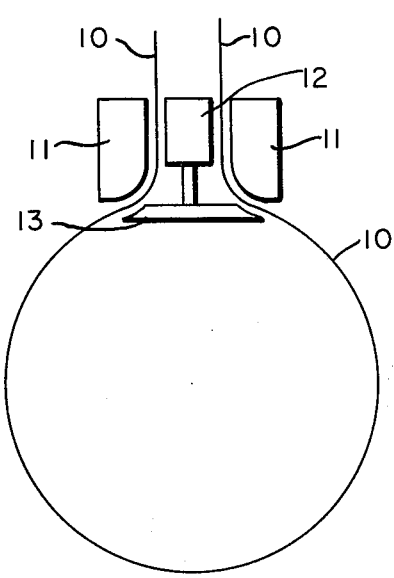
FIG. 2 is an end view of FIG. 1.
Figure 6:
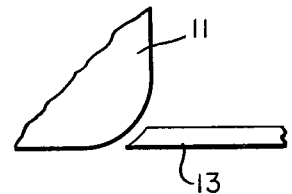
FIG. 6 depicts the matching shapes in the form of curves of the clamp edges and the plate which abut during operation.

To minimize formation of this ridge, a plate 13 is used to continue the curvature of the circumference of the looped sheet across the region where the looped sheet is clamped. To insure proper fit, and to provide a means for positioning and tensioning plate 13, a spacer 12 is placed between the ends of flexible sheet 10 where they are clamped between clamps 11. The spacer and the plate can be an integral part. In order to insure a tight fit when the plate is tensioned to fit against the lower edge of the clamps both the edges of the clamps and the edges of the plate which abut one another are beveled or curved in matching configuration as shown in FIG. 6. Of course, since the ridge ordinarily forms all along the length of the plastic tubing, it is important that the plate extend longitudinally the length of the tubing. Thus, the plate will be long and narrow and for a good fit and for handleability it should also be flexible along its length.

The spacer may be lowered into position and held by the opposing clamps, or it may contain screws or threads whereby it can be affixed to adjacent threads or screws or hydraulic devices on one clamp. In this instance care must be taken to ensure that the fasteners are employed at locations which will not interfere with the adjustability of the diameter of the looped flexible sheet.

Figure 3:
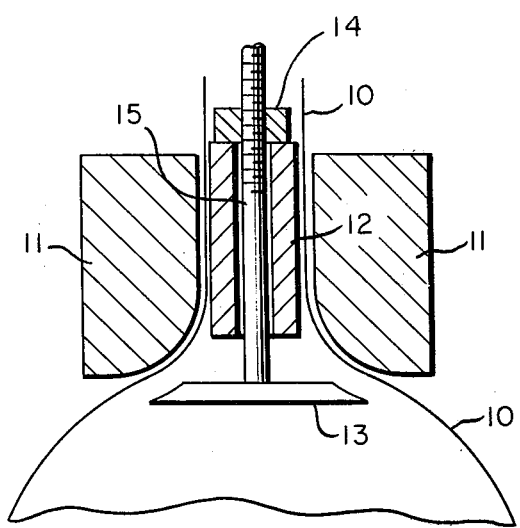
FIG. 3 is an enlarged view of the device of this invention showing one means for fastening the plate 13 to spacer 12 by nut 14 and stem 15.
Figure 4:
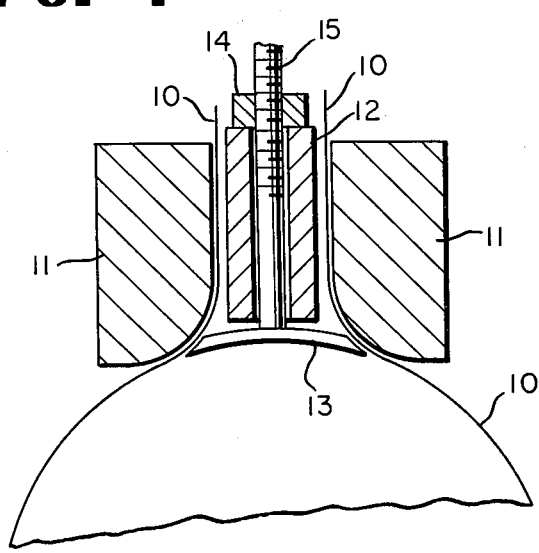
FIG. 4 is an enlarged view of the device of this invention showing how the plate is tensioned to adopt a curvature substantially conforming to the curvature of the looped flexible sheet by tightening nut 14.

Tension can be applied to the plate by a variety of means. One means, shown in FIGS. 3 and 4, is to provide the metal plate with a stem 15 threaded at the top, and containing a nut 14. If the plate is made of a resilient material, by continuing to tighten the nut after the plate is drawn into abutment with the shaped edges of the clamps, as shown in FIG. 4, the plate will be forced into a curved configuration. Thus the curvature of the plate can be adjusted to conform to the curvature of the circumference of the cylindrical restraint formed by the looped flexible sheet. Another means for tensioning, especially where the space and the plate are integral, is hydraulic means.

The device of this invention, and its use in making heat-shrinkable plastic tubing are illustrated in the following examples.

EXAMPLE 1

Tetrafluoroethylene/hexafluoropropylene copolymer having a melt viscosity of about $40 \times 10^4$ poises at 372°C. was extruded by conventional means to form an expandable plastic tube 2.37 inches in diameter with a wall thickness of about 0.025 inch. A piece of this tubing about 35¼ inches long was fitted with end plugs made of aluminum discs and neoprene rubber gaskets and tightened with clamping bands. The plugs were fitted with openings to provide for gas inlet and exit.

The tubing with the plugs was mounted on the fixtures of an expansion apparatus, which was constructed from a metal-working lathe. The motor and turning mechanism were removed from the head stock, which was modified to serve as a fixture to hold the inlet end plug in position. The tail stock of the lathe was similarly modified to hold the exit end plug. The tail stock was arranged so that it could slide freely along the lathe bed. End tension could be supplied by means of a pulley and a weight, or the tail stock could be clamped in place by tightening a nut. In this example, an 8 pound weight was used to provide end tension, and the tail stock was not clamped. The apparatus was piped to provide steam pressure or air pressure through the inlet pipe and to allow venting or closing of the vent at the exit plug.

A loop of polyimide film (the flexible sheet) was made around the plastic tubing in the apparatus. This film was 0.005 inch thick (Kapton 500 gage polyimide film).

Two aluminum clamping bars, with $1 \times 2$ inch rectangular cross-sections and a length of about 31 inches were used. The lower opposing edges were rounded with a ½ inch radius. The clamps were supported by the apparatus.

The spacer employed was made of aluminum and the plate employed was made of a stainless steel metal plate sheet. The plate was sharpened or curved on its edges to conform them with the rounded lower edges of the opposing clamping bars.

The looped flexible sheet was adjusted to provide a circumference of about 10 inches. The spacer and plate were positioned and the aluminum clamps tightened together by means of C-clamps to hold the film ends and the spacer firmly between them.

With the exit valve open, steam at 20 psig supply pressure was admitted through the inlet to sweep out air. The exit valve was then closed. During a period of 20 seconds, the tubing was further heated by the steam and expanded so that it pressed against the flexible restraining tube. A valve was then opened to admit air at 22 psig. The steam valve was simultaneously closed. The exit valve was then opened only slightly to permit gas to escape but to maintain the pressure inside the radially expanded plastic tubing. Compressed air flowed through the tubing interior until it had been cooled sufficiently so that the pressure could be removed without the tubing shrinking.

The result was a piece of plastic tubing with a cylindrically expanded section, two end sections of the original, unexpanded diameter, and two transition sections between the end diameter and the expanded diameter. Cutting off the end and transition sections gave a length of heatshrinkage plastic tubing which has the desired property of shrinking back to its original diameter when heated above 150°C. The heat-shrinkable plastic tubing was smooth with no visible ridge. The cross-section was substantially circular except for a slight flattening where the plate was because the plate had not been tensioned to adopt the curvature of the restraint cylinder.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A device for minimizing the seam formed longitudinally along the exterior of heat-shrinkable plastic tubing when the tubing is prepared by pressurizing and heating the interior of an expandable plastic tubing until it is expanded against a cylindrical-like sheet surrounding the plastic tubing, which cylindrical-like sheet has been formed by looping the sheet and clamping the looped ends with longitudinal clamps, which comprises
   a. a pair of opposing clamps having opposing surfaces for clamping the looped flexible sheet, said clamps extending longitudinally along the length of the looped sheet and positioned to clamp the looped ends of the sheet, said clamps each having a shaped surface along the edge that abuts the looped sheet where the looped ends enter between the clamps, b. a spacer positioned between said clamps and between the opposing looped ends of the sheet, extending longitudinally the length of the clamps, said spacer having means for receiving and fastening a plate which extends into the closure formed by the looped sheet, c. a longitudinally flexible plate within the closure formed by the looped sheet extending longitudinally the length of the clamps, constructed and arranged to be fastened to said spacer at said means for receiving and fastening a plate, so that the plane of the plate is perpendicular to the opposing surfaces of the clamps, said plate having shaped portions along each longitudinal edge thereof constructed and positioned to conform with and match the shaped surface of each said clamp when in abutting position therewith, and d. means for adjusting the position of said plate relative to said spacer.

2. The device of claim 1 wherein the plate is resilient.

3. The device of claim 2 which includes means for applying tension to said plate.

* * * * *